United States Patent
Somanath et al.

(10) Patent No.: US 12,162,627 B2
(45) Date of Patent: Dec. 10, 2024

(54) AIRCRAFT COMPONENT REPAIR SYSTEM AND PROCESS

(71) Applicant: United Technologies Corporation, Farmington, CT (US)

(72) Inventors: Nagendra Somanath, South Windsor, CT (US); Kurt R. Heinemann, East Hampton, CT (US); Evan Selin, Rocky Hill, CT (US); Glenn Levasseur, Colchester, CT (US)

(73) Assignee: RTX Corporation, Farmington, CT (US)

( * ) Notice: Subject to any disclaimer, the term of this patent is extended or adjusted under 35 U.S.C. 154(b) by 1253 days.

(21) Appl. No.: 16/376,294

(22) Filed: Apr. 5, 2019

(65) Prior Publication Data

US 2020/0317370 A1 Oct. 8, 2020

(51) Int. Cl.
*B64F 5/60* (2017.01)
*G01M 15/14* (2006.01)

(52) U.S. Cl.
CPC ............... *B64F 5/60* (2017.01); *G01M 15/14* (2013.01); *F05D 2260/81* (2013.01)

(58) Field of Classification Search
CPC ...... B64F 5/60; G01M 15/14; F05D 2260/81; F05D 2230/80; F05D 2260/80;
(Continued)

(56) References Cited

U.S. PATENT DOCUMENTS

| | | | |
|---|---|---|---|
| 6,701,615 B2 | 3/2004 | Harding et al. | |
| 6,850,874 B1 * | 2/2005 | Higuerey | B23H 7/20 703/4 |

(Continued)

FOREIGN PATENT DOCUMENTS

| | | |
|---|---|---|
| EP | 1857637 | 11/2007 |
| EP | 2241726 | 10/2010 |

(Continued)

OTHER PUBLICATIONS

European Search Report for Application No. 21067795.2 dated Jul. 15, 2020.

*Primary Examiner* — Tung S Lau
(74) *Attorney, Agent, or Firm* — Carlson, Gaskey & Olds, P.C.

(57) ABSTRACT

A repair system for gas turbine engine components includes a computer system configured to receive a set of measured parameters for each gas turbine engine component in a plurality of substantially identical gas turbine engine components, and determine a variation model based on the set of measured parameters wherein each of the gas turbine engine components is an as-run component and has been exposed to a substantially identical general wear pattern. The computer system includes at least one simulated engine model. The simulated engine model is configured to determine a predicted operation of each gas turbine engine component in the plurality of substantially identical gas turbine engine components. A correlation system is configured to correlate variations in the set of parameters for each of the gas turbine engine components in the plurality of substantially identical gas turbine engine components with a set of the predicted operations of each gas turbine engine component in the plurality of substantially identical gas turbine engine components, thereby generating a predictive model based on the variations. A repair module is configured to generate a repair formula based on the predictive model. The repair formula is configured to receive a set of measured parameters of an as-run gas turbine engine component and determine a suggested repair capable of repairing the as-run gas turbine engine component.

20 Claims, 7 Drawing Sheets

(58) Field of Classification Search
CPC .... F05D 2270/708; B23P 6/002; Y02T 50/60; F01D 5/005
See application file for complete search history.

(56) References Cited

U.S. PATENT DOCUMENTS

| | | | |
|---|---|---|---|
| 6,912,446 | B2 | 6/2005 | Wang et al. |
| 7,582,359 | B2* | 9/2009 | Sabol ............... F01D 17/02 702/182 |
| 8,004,423 | B2* | 8/2011 | Mitchell ............ F01D 21/003 73/754 |
| 8,600,611 | B2 | 12/2013 | Seize |
| 2002/0128790 | A1 | 9/2002 | Woodmansee |
| 2007/0271023 | A1* | 11/2007 | Morris ............... F01D 21/003 701/100 |
| 2010/0153954 | A1* | 6/2010 | Morrow ............... G06F 1/329 718/102 |
| 2010/0257838 | A1* | 10/2010 | Mazzaro ............ G05B 13/028 702/184 |
| 2014/0223737 | A1* | 8/2014 | Kell .................. B23K 26/40 29/889.1 |
| 2016/0047392 | A1* | 2/2016 | Bernocchi ........... F04D 17/10 415/17 |
| 2017/0226860 | A1 | 8/2017 | Aschermann et al. |
| 2017/0323274 | A1* | 11/2017 | Johnson ............ G05B 13/041 |
| 2018/0002039 | A1* | 1/2018 | Finn .................. G07C 5/0808 |
| 2018/0164796 | A1* | 6/2018 | Garciamoreno ...... F01D 21/003 |
| 2018/0284758 | A1* | 10/2018 | Cella ................. G06Q 30/0278 |

FOREIGN PATENT DOCUMENTS

| | | |
|---|---|---|
| EP | 3206103 | 8/2017 |
| EP | 3264341 | 1/2018 |
| GB | 2510635 | 8/2014 |

* cited by examiner

AIRCRAFT COMPONENT REPAIR SYSTEM AND PROCESS

TECHNICAL FIELD

The present disclosure relates generally to a process for repairing gas turbine engine components, and more specifically to a process for evaluating repair operations for a worn component.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via one or more shaft, the rotation of the turbine section further drives the compressor section to rotate. In some examples, a fan is also connected to the shaft and is driven to rotate via rotation of the turbine as well.

Any given gas turbine engine is constructed of a significant number of individually manufactured components. Among the individually manufactured components can be blades, vanes, panels, outer air seals, and the like. In some cases, such as with a compressor rotor or a fan, multiple substantially identical components can be utilized in a single engine assembly. During operation of an engine it is possible for one or more parameter of a given component to be worn out of specification, resulting in a sub-optimal or an unusable component.

SUMMARY OF THE INVENTION

In one example, a repair system for gas turbine engine components includes a computer system configured to receive a set of measured parameters for each gas turbine engine component in a plurality of substantially identical gas turbine engine components, and determine a variation model based on the set of measured parameters wherein each of the gas turbine engine components is an as-run component and has been exposed to a substantially identical general wear pattern, the computer system having at least one simulated engine model, the simulated engine model being configured to determine a predicted operation of each gas turbine engine component in the plurality of substantially identical gas turbine engine components, a correlation system configured to correlate variations in the set of parameters for each of the gas turbine engine components in the plurality of substantially identical gas turbine engine components with a set of the predicted operations of each gas turbine engine component in the plurality of substantially identical gas turbine engine components, thereby generating a predictive model based on the variations, and a repair module configured to generate a repair formula based on the predictive model, wherein the repair formula is configured to receive a set of measured parameters of an as-run gas turbine engine component and determine a suggested repair capable of repairing the as-run gas turbine engine component.

In another example of the previously described repair system, the plurality of substantially identical gas turbine engine components are manufactured via a single manufacturing process.

In another example of any of the previously described repair systems the qualification and repair formula is configured to suggest a repair operation of an as-run gas turbine engine component subjected to the same general wear pattern as the plurality of substantially identical gas turbine engine components.

In another example of any of the previously described repair systems the plurality of substantially identical gas turbine engine components includes at least 25 substantially identical turbine engine components.

In another example of any of the previously described repair systems the plurality of substantially identical gas turbine engine component includes at least 200 substantially identical turbine engine components.

In another example of any of the previously described repair systems the qualification and repair formula is a set of mathematical functions, each of which relates at least two parameters of the set of measured parameters for each gas turbine engine component.

In another example of any of the previously described repair systems the suggested repair is a change in at least one of the measured parameters of the as-run gas turbine engine component.

In another example of any of the previously described repair systems the suggested repair further includes at least one suggested process for achieving the change in the at least one of the measure parameters of the as-run gas turbine engine component.

In another example of any of the previously described repair systems the suggested process includes a blending operation.

In another example of any of the previously described repair systems the repair module is configured to compare the outputs of the repair formula to a qualification and repair table and determine that the as-run gas turbine engine component deviates from a qualification parameter when at least one of the outputs fall outside of a set of ranges defined in the qualification and repair table.

In another example of any of the previously described repair systems the suggested repair is a procedure that places the at least one of the outputs that falls outside of the set of ranges defined in the qualification and repair table within the set of ranges.

In another example of any of the previously described repair systems, the repair module is configured to provide the suggested repair to a maintenance system, thereby causing the maintenance system to affect the suggested repair.

In another example of any of the previously described repair systems the at least one simulated engine model is a simulation of an actual engine in which the as-run gas turbine engine component is included.

In another embodiment, a method for repairing a gas turbine engine component includes training a repair formula via receiving a set of measured parameters for each gas turbine engine component in a set of as-run gas turbine engine components, wherein each as-run gas turbine engine component has the same general wear pattern, generating a variation model of the set of as-run gas turbine engine components, determining a simulated response of each of the as-run gas turbine engine components within a simulated engine model, and correlating variations in the set of parameters for each of the as-run gas turbine engine components in the set of as-run gas turbine engine components with a set of the predicted operations of each gas turbine engine component in the set of as-run gas turbine engine components, thereby generating a predictive model based on the variations, and generating a suggested repair operation for a second gas turbine engine component for at least one engine by providing a set of measured parameters of the second gas turbine engine component to the repair formula, comparing a plurality of outputs from the repair formula to a qualification and repair table, and determining the suggested repair operation when at least one output in the plurality of outputs falls outside of a first set of ranges defined in the qualification and repair table.

Another example of the above method further includes performing the suggested repair operation on the second gas turbine engine component.

In another example of any of the above methods the plurality of set of as-run gas turbine engine components includes at least 200 gas turbine engine components In another example of any of the above methods each of the gas turbine engine components in the set of as-run gas turbine engine components is manufactured using a single manufacturing process.

In another example of any of the above methods the second gas turbine engine component has the same general wear pattern as each as-run gas turbine engine component in the set of as-run gas turbine engine components.

In another example of any of the above methods the repair formula includes a set of mathematical functions, each of which relates at least two parameters of the set of measured parameters for each gas turbine engine component.

In another example of any of the above methods the suggested repair is a procedure that places the at least one of the outputs that falls outside of These and other features of the present invention can be best understood from the following specification and drawings, the following of which is a brief description.

DETAILED DESCRIPTION OF AN EMBODIMENT

Figure 1:
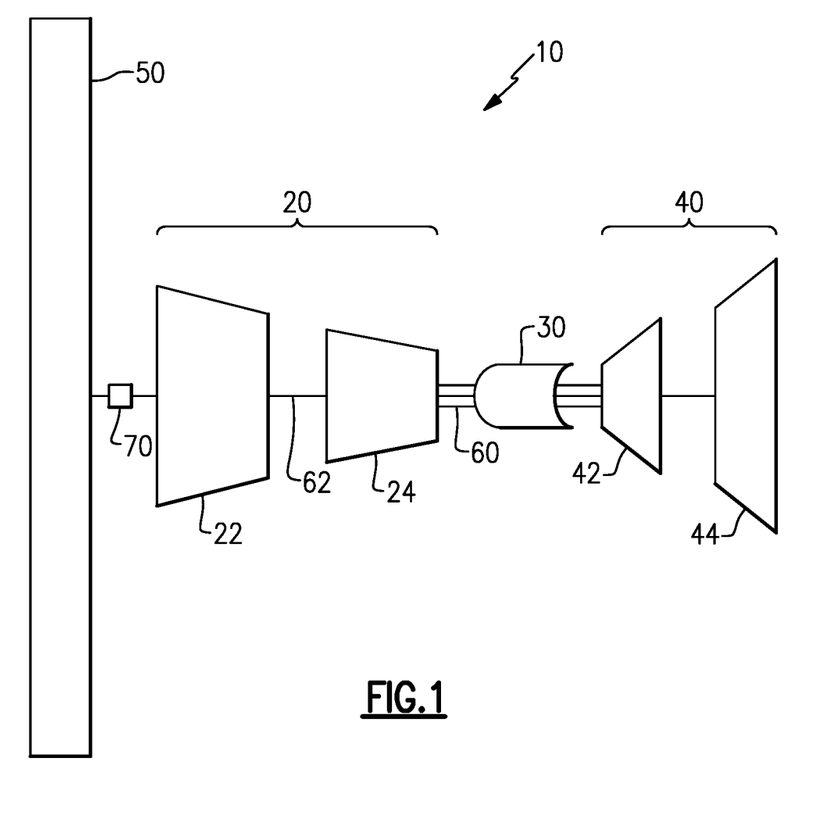
FIG. 1 illustrates a high level schematic view of an exemplary gas turbine engine.

FIG. 1 schematically illustrates a gas turbine engine 10 including a compressor section 20, a combustor section 30, and a turbine section 40. Positioned fore of the compressor section 20 is a fan 50. The compressor section 20 includes a low pressure compressor 22 and a high pressure compressor 24. Similarly, the turbine section 40 includes a high pressure turbine 42 and a low pressure turbine 44. The high pressure turbine 42 is connected to the high pressure compressor 24 via a first shaft 60 and rotation of the high pressure turbine 42 drives rotation of the high pressure compressor 24. Similarly, the low pressure compressor 22 is connected to the low pressure turbine 44 via a second shaft 62 and the rotation of the low pressure turbine 44 drives rotation of the low pressure compressor 22. In the example engine 10 of FIG. 1, the fan 50 is connected to, and driven by, the first shaft 62 via a gear system 70.

One of skill in the art will appreciate that in alternative examples, an alternative number of turbines 42, 44 and compressors 22, 24 can be utilized and still achieve similar results. Similarly, the fan 50 can be driven via a direct connection to the shaft 62 instead of the geared system 70, or driven in any other known manner.

Each of the fan 50, the compressors 22, 24 and the turbines 42, 44 are constructed from multiple substantially identical components which can include rotor blades, vanes, blade outer air seals, and the like. Each component is constructed according to a set of multiple design parameters. Each of those design parameters is given a range of acceptable values to account for manufacturing variations, as well as tolerances with the engine structure.

Existing component qualification systems determine the as-manufactured dimensions of each manufactured component, compare the measured dimensions of the manufactured component to the design dimensions, including tolerances, and determine that the component is "acceptable" when every parameter falls within the as designed specification. The type of manufacturing process used to make the part, and the relationship between each measured parameter and each other measured parameter is not included within the existing analysis. In some examples, such as those where the manufacture of each component is particularly expensive, unqualified components are manually reviewed to determine if the component may still be acceptable for use within an engine despite including one or more parameter that is outside of the as designed tolerances. In alternative examples, the unqualified component can be scrapped or reworked to meet tolerances.

Figure 2A:
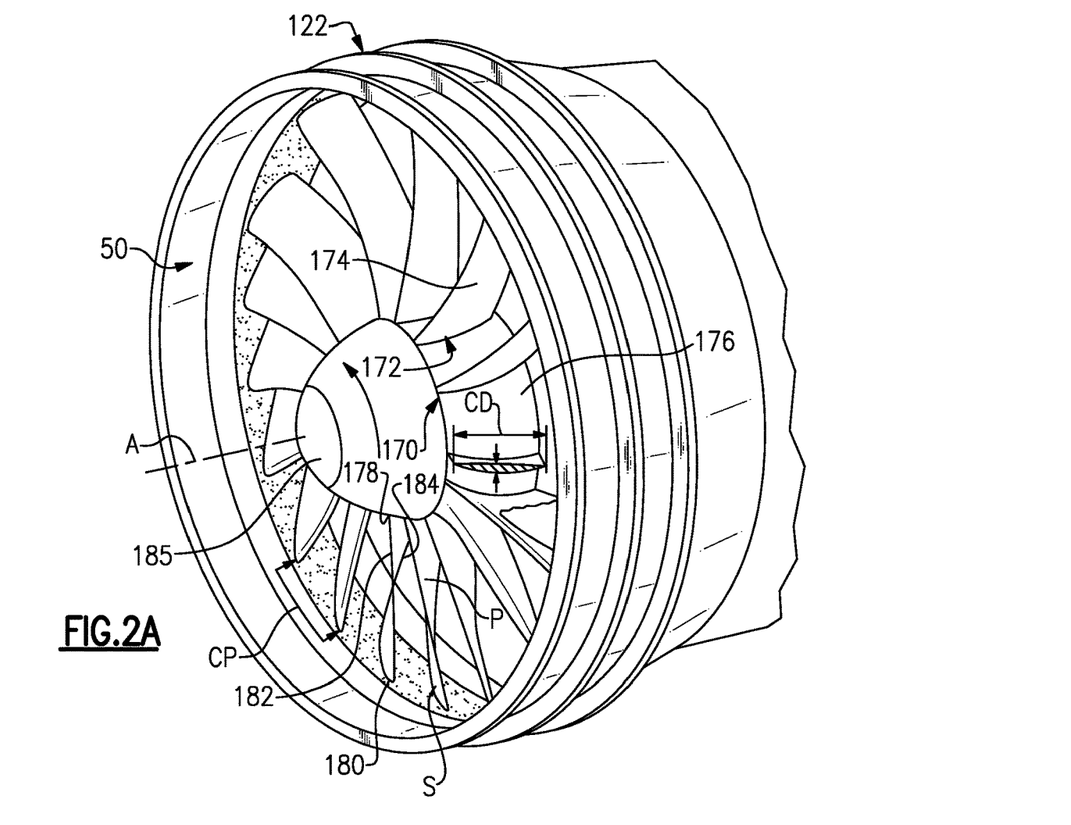
FIG. 2A is a perspective view of a fan section of the engine of FIG. 1.
Figure 2B:
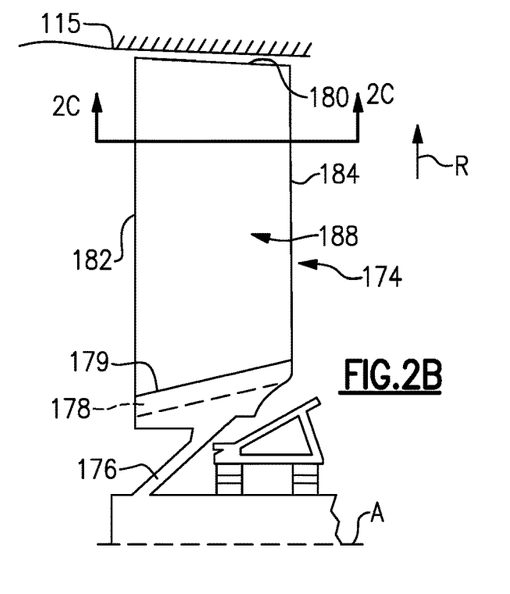
FIG. 2B is a schematic cross-sectional view of the fan section of FIG. 2A.
Figure 2C:
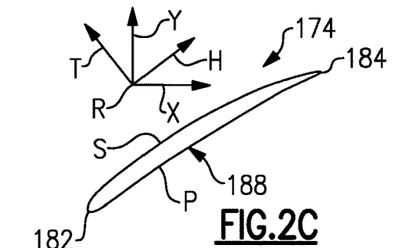
FIG. 2C is a schematic view of a cross-section of an airfoil of FIG. 2B sectioned at a particular span position and depicting directional indicators.

One such structure in the example of FIG. 1 is the fan 50. Referring to FIGS. 2A-2C, the fan 50 includes a rotor 170 having an array or row 172 of airfoils or blades 174 that extend circumferentially around, and are supported by, the fan hub 176. Any suitable number of fan blades 174 may be used in a given application. The hub 176 is rotatable about the engine axis A. The array 172 of fan blades 174 are positioned about the axis A in a circumferential or tangential direction Y. Each of the blades 174 includes an airfoil body that extends in a radial span direction R from the hub 176 between a root 178 and a tip 180, in a chord direction H (axially and circumferentially) between a leading edge 182 and a trailing edge 184 and in a thickness direction T between a pressure side P and a suction side S.

Each blade 174 has an exterior surface 188 providing a contour that extends from the leading edge 182 aftward in a chord-wise direction H to the trailing edge 184. The exterior surface 188 of the fan blade 174 generates lift based upon its geometry and directs flow along the core flow path and bypass flow path. The fan blade 174 may be constructed from a composite material, or an aluminum alloy or titanium alloy, or a combination of one or more of these. Abrasion-resistant coatings or other protective coatings may be applied to the fan blade 174.

A chord, represented by chord dimension (CD), is a straight line that extends between the leading edge 182 and the trailing edge 184 of the blade 174. The chord dimension (CD) may vary along the span of the blade 174. The row 172 of blades 174 also defines a circumferential pitch (CP) that is equivalent to the arc distance between the leading edges 182 or trailing edges 184 of neighboring blades 174 for a corresponding span position. The root 178 is received in a correspondingly shaped slot in the hub 176. The blade 174 extends radially outward of a platform 179, which provides the inner flow path. The platform 179 may be integral with the blade 174 or separately secured to the hub 176, for example. A spinner 185 is supported relative to the hub 176 to provide an aerodynamic inner flow path into the fan section 122.

Figure 3A:
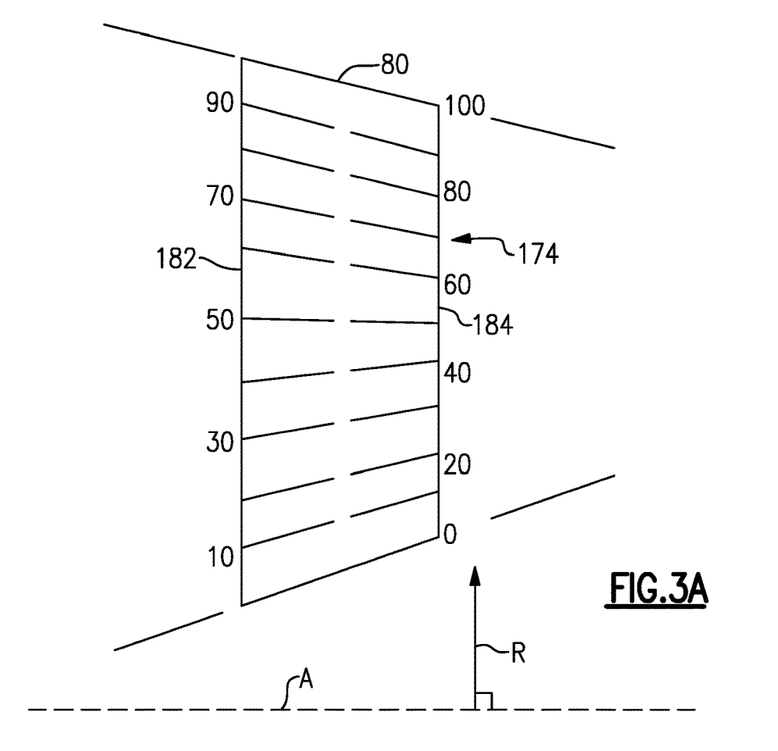
FIG. 3A is a schematic view of airfoil span positions.
Figure 3B:
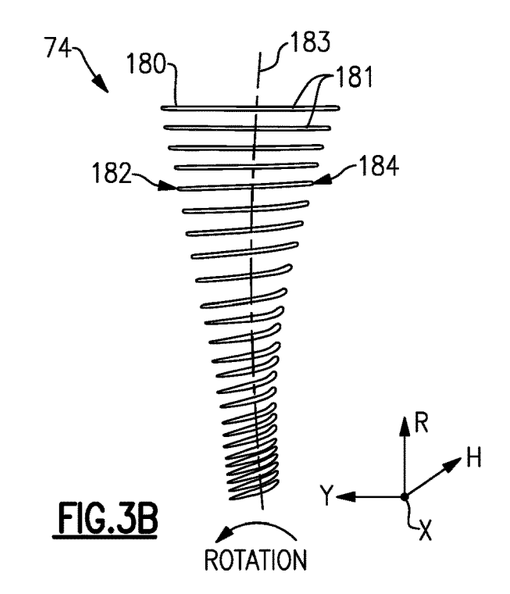
FIG. 3B is a perspective view of sections of the airfoil of FIG. 2A at various span positions.

Referring to FIGS. 3A-3B, span positions are schematically illustrated from 0% to 100% in 10% increments to define a plurality of sections 181. Each section at a given span position is provided by a conical cut that corresponds to the shape of segments the bypass flowpath or the core flow path, as shown by the large dashed lines (shown in FIG. 3A). In the case of a fan blade 174 with an integral platform, the 0% span position corresponds to the radially innermost location where the airfoil meets the fillet joining the airfoil to the platform 179. In the case of a fan blade 174 without an integral platform, the 0% span position corresponds to the radially innermost location where the discrete platform 179 meets the exterior surface of the airfoil (shown in FIG. 2B). A 100% span position corresponds to a section of the blade 174 at the tip 80.

In some examples, each of the blades 174 defines a non-linear stacking axis 183 (shown in FIG. 3B) in the radial direction R between the tip 180 and the inner flow path location or platform 179. For the purposes of this disclosure, "stacking axis" refers to a line connecting the centers of gravity of airfoil sections 181. In some examples, each fan blade 174 is specifically twisted about a spanwise axis in the radial direction R with a corresponding stagger angle at each span position and is defined with specific sweep and/or dihedral angles along the airfoil 174. Airfoil geometric shapes, stacking offsets, chord profiles, stagger angles, sweep, dihedral angles, and surface shape in an X, Y, Z coordinate system, among other associated features, can be incorporated individually or collectively to improve characteristics such as aerodynamic efficiency, structural integrity, and vibration mitigation, for example.

Figure 3C:
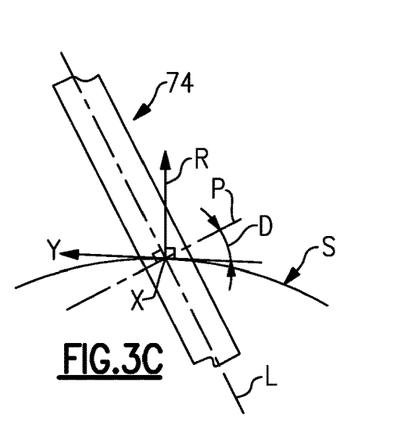
FIG. 3C is a schematic representation of a dihedral angle for an airfoil.

In some examples, the airfoil 174 defines an aerodynamic dihedral angle D (simply referred to as "dihedral") as schematically illustrated in FIG. 3C. An axisymmetric stream surface S passes through the airfoil 174 at a location that corresponds to a span location (FIG. 3A). For the sake of simplicity, the dihedral D relates to the angle at which a line L along the leading or trailing edge tilts with respect to the stream surface S. A plane P is normal to the line L and forms an angle with the tangential direction Y, providing the dihedral D. A positive dihedral D corresponds to the line tilting toward the suction side (suction side-leaning), and a negative dihedral D corresponds to the line tilting toward the pressure side (pressure side-leaning).

As can be seen, each individual fan blade 174 defines multiple parameters such as chord dimension, radial span length, thickness, contour, circumferential pitch, stacking axis, stagger angle, sweep angle, and dihedral angle. Further, many of the example parameters as well as additional parameters can be required to meet tolerances at each of multiple span positions resulting in a substantial number of parameters, any one of which can disqualify the fan blade 174 if it is out of tolerance range under existing manufacturing processes. While described above with regards to the fan 50, and individual fan blades 174, it should be understood that similar parameters exist for any given blade and/or vane utilized through the engine 10, including those within the compressor section 20, and the turbine section 40. Further, any number of other engine components can have similar numbers of parameters, all of which must be within tolerance, even if the parameters of the given component are not the same as the airfoil parameters described above. It is further recognized that normal wear, or wear as the result of damaging events, can impact the parameters of a fan blade that has been put in service in an engine. As a result of the wear, the fan blade can become disqualified, and a repair operation may be necessary to repair the blade.

Figure 7:
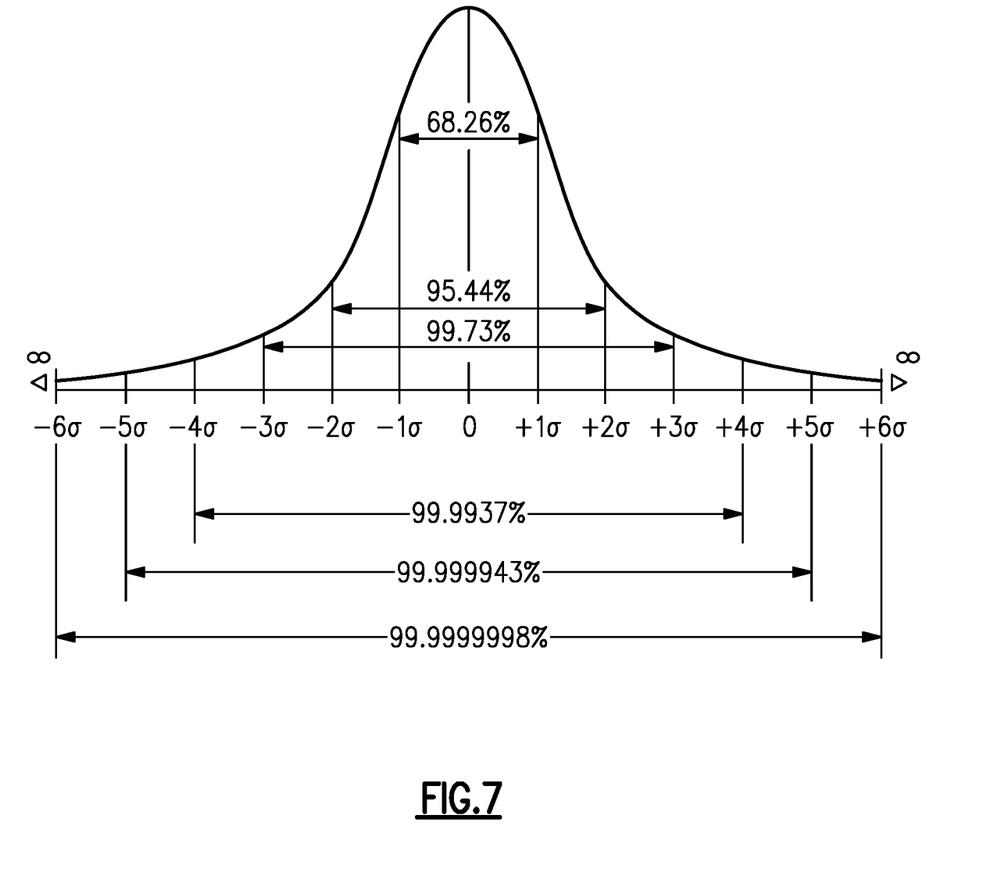
FIG. 7 schematically illustrates an exemplary distribution curve.

Designed parts are required to adhere to a design intent mean and accepted tolerances that would allow efficient assembly of the component from the set of parts produced by a vendor. Typically each part needs to adhere to its design intent and variations are acceptable with a 3σ criteria and thus are expected to fall within a typical distribution curve (as illustrated in FIG. 7.) Typically the parts should fall within the 99.73% region of the normal distribution as per design intent to ensure meeting design intent of part life and component performance metrics. The set of parts in a component like the fan or compressor all have to be within this accepted normal distribution to be introduced for assembly into the component and engine.

Under current manufacturing or repair processes, if any of the above described parameters, or any similar parameters that may be necessary for a given component, are out of tolerance at any single point the component will fail inspection (be disqualified) and either be scrapped or provided to an engineering team for manual review. Further it should be understood that the above described parameters are merely exemplary parameters of a fan blade 174, and practical components can include more and different parameters that are subjected to the same level of analysis when qualifying the component.

As the part and component are introduced into the field, operational environment effects lead to deterioration of the shape of the airfoil impacting part life and component performance. This further leads to deterioration of engine performance in the field.

With reference to each of FIGS. 1-3C, disclosed herein is an improved system and process for qualifying repair processes of parts based on the totality of the part configuration, rather than individually based on each parameter at each location on the component. In some examples, one or more parameter may be out of tolerance either due to manufacturing variance or due to wear, but when the component is considered as a whole the component is still in an acceptable configuration. Further exacerbating this is the fact that different manufacturing techniques for any given component (e.g. additive manufacturing vs. casting) can result in different acceptable configurations, or different wear patterns, that may include one or more parameter outside of the as designed tolerances.

With continued reference to FIGS. 1-3C, FIG. 4 schematically illustrates an exemplary system 300 for developing and analyzing a batch of as-run parts in order to determine a repair procedure for individual parts. Initially a set of as-run parts that were manufactured using a single manufacturing process or uniform combination of processes is identified in an identify as-run parts step 310. Once a sufficient number of the as-run parts have been identified, each parameter of each of the as-run parts is measured in an inspect parts step 320. The inspect parts step 230 can be performed over a substantial period of time, as components are removed from aircraft engines during standard maintenance, or can be performed as a one-time maintenance instance for all the identified parts at the same time.

Figure 4:
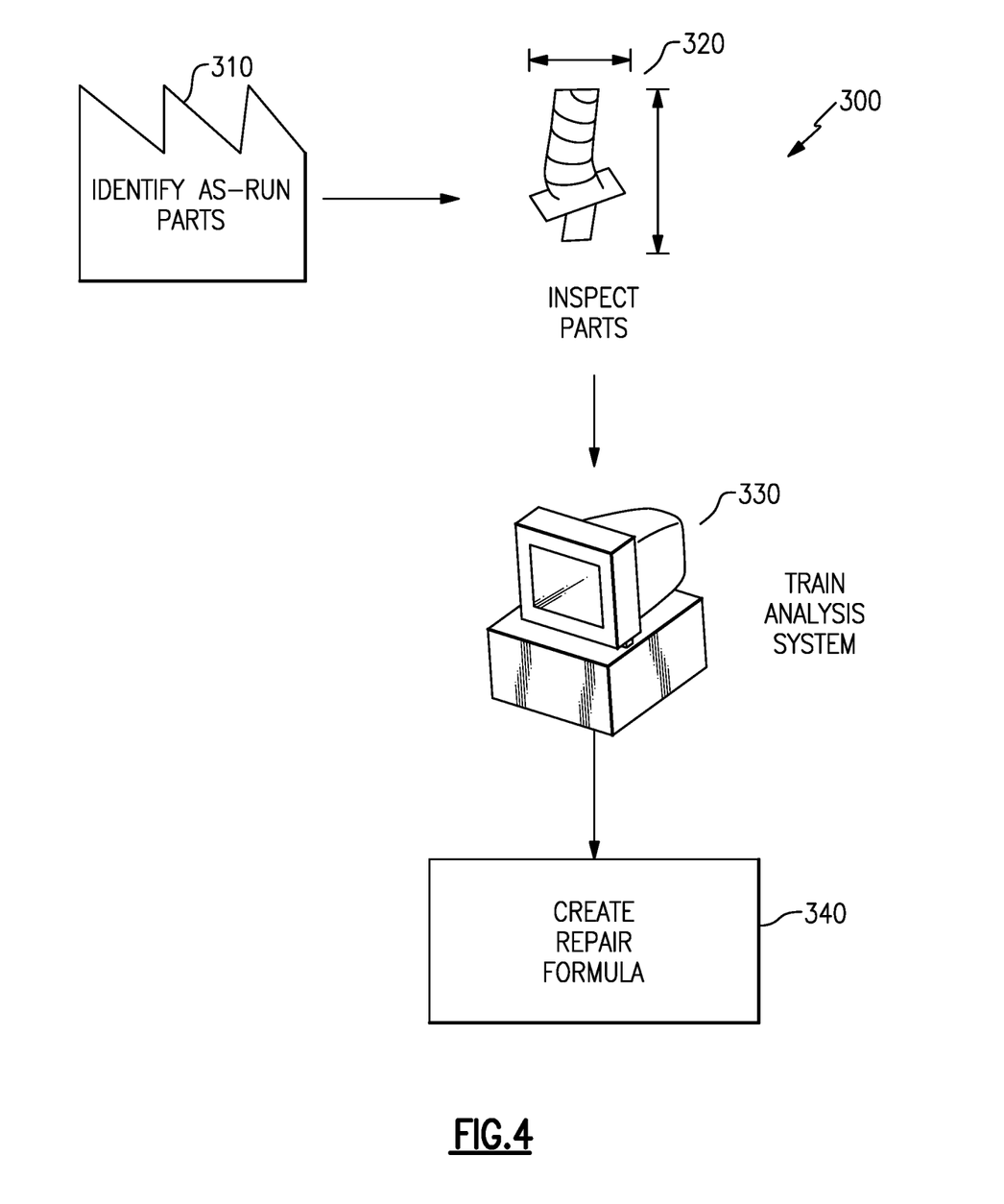
FIG. 4 schematically illustrates an exemplary system for analyzing as-run parts to create a repair formula.

The output of the inspect parts step 320 is a data set that includes a measurement of each parameter of each as-run part in the identified set. The as-run data set is then provided to a computer system and is used by the computer system to train a part analysis in a "train analysis system" step 330 within the train analysis step 330. The computer system develops a variance model that models the variations of an average, or exemplary as-run part, for the specific manufacturing process or processes and the specific wear case of the identified as-run part set, based on the set of measured as-run parts. Contemporaneously with the variance model, the computer system develops a predictive model, that can predict the behavioral characteristics, such as efficiency, bending, vibration, etc. of a given component based on the specific parameters of that component and the engine in which the component is to be included. The specific parameters of the actual engine in which the component is to be included are utilized to develop the variance model in some examples.

The variation model is a dimension reducing model, and describes a large number of observable variables' values using a smaller number of independent, latent variables. A latent variable is a variable whose value depends on our understanding of the latent structure inside the observed data. The latent structure of the data can only be determined from correlation analysis of the observed variables, and the correlation analysis requires observations of multiple as-manufactured parts. The usage of the as-run measurements of the set of as-run components to create the variance model and the predictive model can be referred to as a principal component analysis (PCA), and provides an accurate model of the actual wear patterns on a specific part design as well as an accurate model of the expected behavior of an actual part profile within an actual engine. In some examples, the predictive model is a Gaussian Process (GP) model.

Based on the predictive model, and the variance model, the computer system then creates a repair formula in a "create repair formula" step 340. The repair formula is a function, or set of functions, that defines an acceptable component based on all of its parameters instead of being based on each parameter's individual tolerances. By comparing an individual as-run part to the repair formula, the computer system can automatically determine a blending operation, or other operation, to bring the as-run part within acceptable parameters. Due to the number of parameters (in some cases the number of parameters can exceed 20), and the number of positions on the part where each parameter is to be measured, the functions determined by the computer system are high order functions, and determining whether an individual component meets the functions would be prohibitively time consuming if performed manually. In other examples, the repair formula can be utilized to verify manually designed repair operations to ensure that the resultant part dimension(s) meet acceptable parameters for the specific engine in which the resultant part will be included.

With continued reference to FIGS. 1-4, FIG. 5 schematically illustrates the "train analysis" step 330 of FIG. 4. Initially, during the train analysis step 330, a computer system receives all of the measured parameters of each component in the set of as-run components in a receive measured parameters step 410. In some examples, the computer system can further determine one or more derived parameter based on a combination or manipulation of one or more of the measured parameters.

Figure 5:
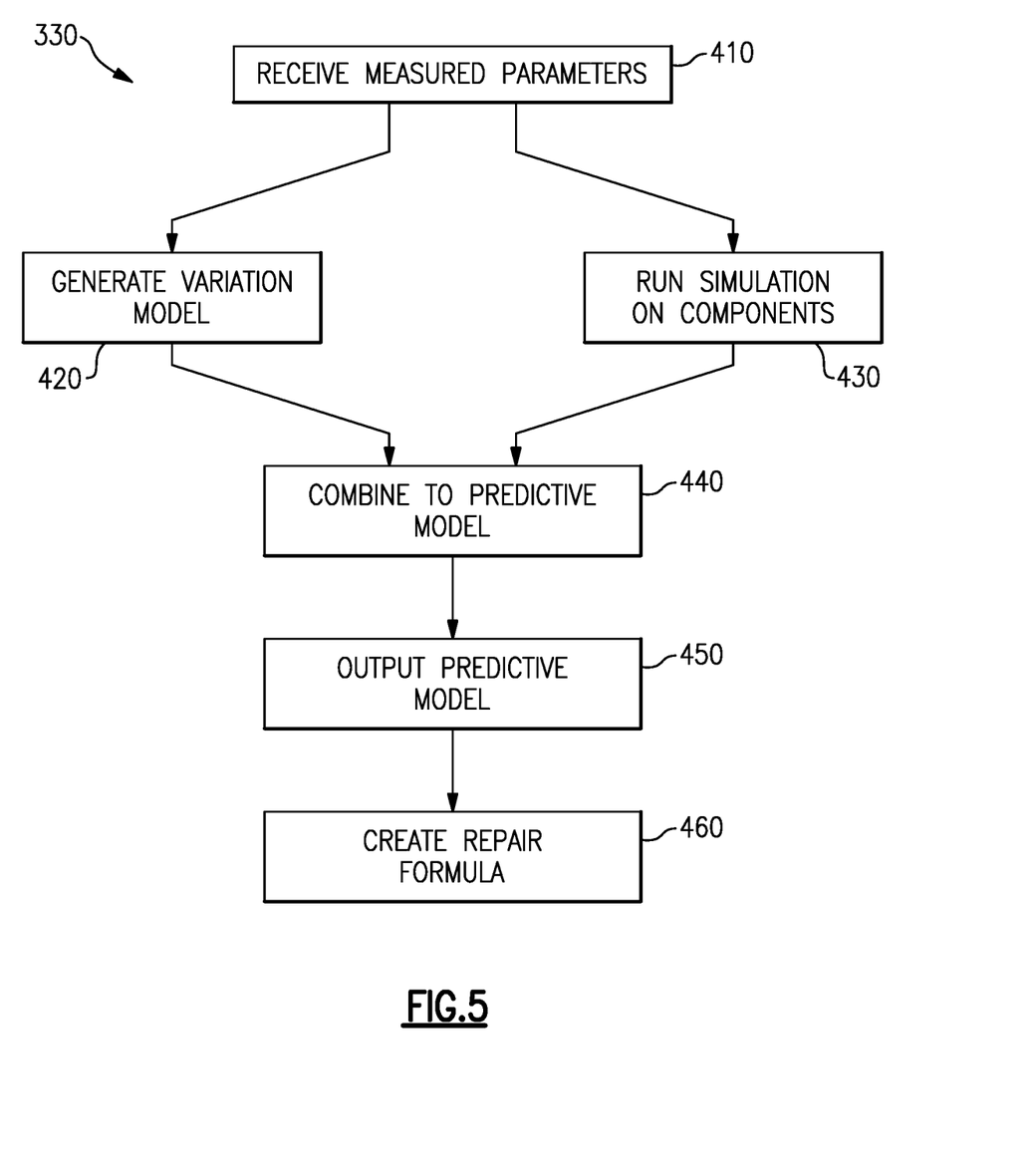
FIG. 5 schematically illustrates a train analysis step for utilization in the process of FIG. 4.

The full data set is passed to a generate variation model operation 420 and a run simulation on components operation 430. During the generate variation model step 420, the computer system determines a single variation model representative of the possible and/or expected variations of the specified component resulting from the particular wear case of the set of as-run parts. The variation model is representative of the general wear of all of the as-run parts in the entirety of the batch. The variation model can include an average figure, standard deviations, tolerances, and the like and be determined using any known process.

During the run simulation on components process 430, the computer system iteratively runs a simulation where each of the components as-run is incorporated into a simulated engine, and a computer simulation is run to determine how the as-run component is expected to operate within a mathematical model of the simulated engine. In some examples, the simulated engine is constructed based on expected dimensions and operations of a given engine model. In alternative examples, the simulated engine is a computer model based on actual as-manufactured and as-run features of the specific engine in which the component to be repaired will be incorporated. The alternative example allows the system to more accurately account for the entirety of the component's operating environment in determining whether the repair profile is acceptable. The results of the simulation for each as-run component are compared and the variations in the parameters between each as-run component and each other as-run component are correlated with variations in the operation of the corresponding simulation results.

Once the simulation results are completed, the process moves to a combine to predictive model step 440. The correlated variations from simulation results are applied to the variation model generated in the generate variation model step 420 in order to determine a predictive model. The predictive model includes a mathematical function describing how any component fitting the variation model is expected to function within the simulated engine without requiring a technician to run the full simulation. In some examples, the predictive model can include a Gaussian process. When the simulated engine is based on the as-run features of a specific engine, instead of the expected features of a hypothetical engine model, the mathematical functions describe how a component fitting the variation model is expected to function within that specific engine. Once generated, the predictive model is output to the computer system in an output predictive model step 450.

Once the predictive model has been output to the computer system, the computer system uses the predictive model to create a repair formula which can be used to identify repairs for a specific as-run component created using the same manufacturing process, and exposed to the same general wear cycle, as the set of components used to train the analysis. As used herein "repair" of a component refers to determining how the component, as-run should be modified such that the as-run component can be utilized in a given engine and implementation of the determined modifications. In some examples, the repair can include determining what type of repair procedure to apply in addition to what dimensions should be modified. The repair formula includes one or more mathematical functions, each of which relates multiple parameters of the as-run component to each other and generates a corresponding output value. In a typical example each of the functions within the repair formula is a higher order function.

As described herein, the train analysis step 330 utilizes a set of as-run components, all of which are manufactured using the same manufacturing process and exposed to generally the same wear pattern. Further, as described herein, generally the same wear pattern refers to engine components that have been operated in the same or similar engine configurations, and undergone the same or similar types of engine cycles. In some examples, the set of as-run components includes at least 25 analyzed as-run components. In further examples, such as ones where the system may need a greater level of accuracy in the repair process, at least 200 analyzed as-run components can be utilized. In yet further examples, where additional training of the analysis is desired, an initial set of as-run components can be supplemented with as-run components manufactured using the same process, and exposed to generally the same wear pattern, that are analyzed at a later date.

Figure 6:
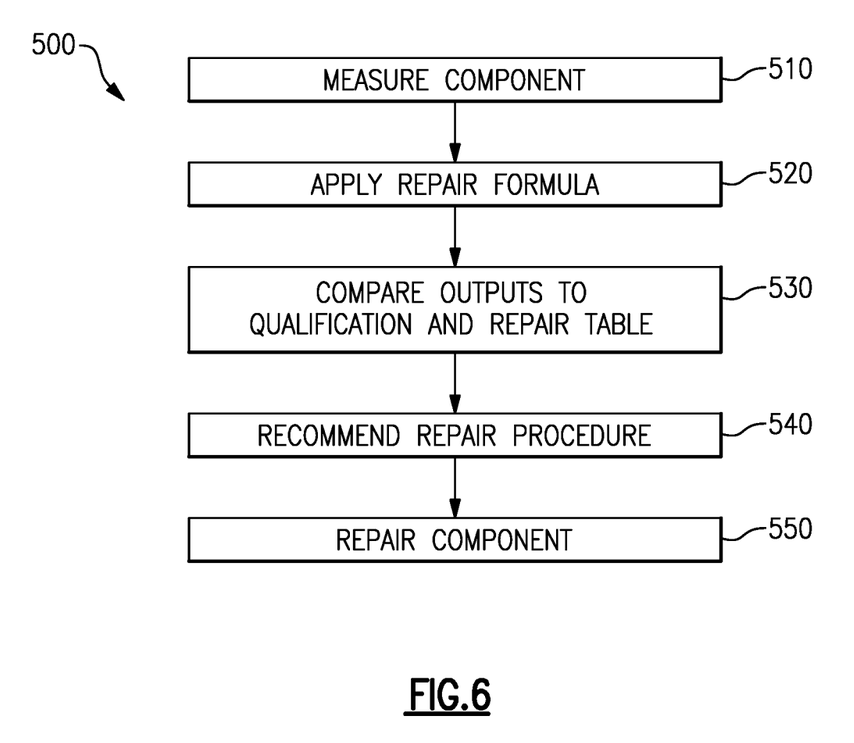
FIG. 6 schematically illustrates a repair process for determining a repair operation for an aircraft component.

With continued reference to FIG. 5, FIG. 6 schematically illustrates a process 500 for repairing an as-run component utilizing the repair formula determined during the final step of the train analysis process of FIG. 4. Initially, the individual component being checked for repair is measured in the same manner as the as-run components used to train the system in a measure component step 510. The measurement determines a measured value of each parameter of the component. The measured parameters are then applied to the repair formula in an apply repair formula step 520. Operating the repair formula using the measured parameters results in a number of outputs, with the number of outputs being equal to the number of functions within the repair formula. Each output represents a predicted performance result of a relationship between two or more of the measured parameters, and is associated with one or more repair procedure should the predicted performance be outside of accepted tolerances.

All of the outputs together form a repair value set of the measured component, and the repair value set is compared with a qualification and repair table in a compare outputs to qualification and repair table step 530. In one example the qualification and repair table includes a range of qualifying values for each function within the repair formula, and when each output is within the listed range, as determined in the comparison step 530, the component is qualified for the engine, and no repair is necessary. When one or more output values are outside of the range included in the qualification and repair table for that parameter, a suggested repair operation that can shift the parameters into the listed range is output in a recommend repair procedures step 540. In some examples, the qualification and repair table can include multiple entries, each corresponding to a different specific engine and/or a different set of requirements for the engine. In such an example, the entry corresponding to the engine from which the as-run component was removed is utilized in the compare outputs to qualification and repair table step 530.

In some examples, the suggested repair procedure is output to a maintenance system, and causes the maintenance system to implement the repair. In such an example, the maintenance system can be automated, semi-automated, or manual. Once a recommended repair procedure has been output a repair technician can then perform the recommended repair procedure, and bring the as-run component back into qualification. In some examples, the repaired component can be measured and analyzed again to determine if the repaired component is acceptable and/or whether further repairs are necessary for the component to be qualified. In such an example, the process 500 of FIG. 6 is reiterated including measuring the as-repaired component.

One advantage realized by the above system is the ability of the qualification and repair formula to identify, and institute repair procedures that account for all of the operational parameters of the as-run component. As a result certain repair profiles that may not meet a strict parameter by parameter tolerance check can still be utilized, further expanding the lifecycle of the as-run component. By using the process described herein, the number of times a blade can be repaired without requiring additional engineering analysis can be increased, thereby reducing the time and expenditure required to repair parts, as well as further reducing waste or scrap parts by decreasing the number of components that are disqualified rather than being repaired.

To ensure that part life and part component performance metrics adhere as closely to design intent as possible, the above repair system ensures that the parts adhere as closely as possible to design intent in part size, shape and toleranceing. In many part configurations, the variation between the parts is more indicative of meeting the design intent than the variation from the center of the tolerance models. Skewed parts (i.e. parts that vary from each other by more than a design intent, while still fitting within tolerances) due to runaway repair process can cause degraded performance The above described process allows parts that need to undergo repair to be compared with the design intent and variance within a specific engine, or specific type of engine rather than against a general intent requirement and can further prevent parts from skewing.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A repair system for gas turbine engine components comprising:
   a computer system configured to receive a set of measured parameters for each gas turbine engine component in a plurality of substantially identical gas turbine engine components, wherein substantial is defined as within tolerances, and determine a variation model based on the set of measured parameters wherein each of the gas turbine engine components is an as-run component and has been exposed to a same general wear pattern, and wherein the plurality of substantially identical gas turbine engine components includes components from a plurality of distinct engines, and said computer system being provided with a plurality of component tolerances to which each of the components were compared as manufactured;
   the computer system including at least one simulated engine model, the simulated engine model being configured to determine a predicted operation of each gas turbine engine component in the plurality of substantially identical gas turbine engine components;
   a correlation system configured to correlate variations in the set of measured parameters for each of the gas turbine engine components in the plurality of substantially identical gas turbine engine components with a set of the predicted operations of each gas turbine engine component in the plurality of substantially identical gas turbine engine components, thereby generating a predictive model based on the variations; and a repair module configured to generate a repair formula based on the predictive model, wherein the repair formula is configured to receive a set of measured parameters of an as-run gas turbine engine component and determine a suggested repair capable of repairing the as-run gas turbine engine component and the suggested repair being based at least in part upon a comparison of the measured parameters to the plurality of component tolerances, wherein the suggested repair results in a repaired as-run gas turbine engine component that includes at least one component parameter outside of the component tolerance of the as-run gas turbine engine component.

2. The repair system of claim 1, wherein the plurality of substantially identical gas turbine engine components are manufactured via a single manufacturing process.

3. The repair system of claim 2, wherein the repair formula is configured to suggest a repair operation of an as-run gas turbine engine component subjected to the same general wear pattern as the plurality of substantially identical gas turbine engine components.

4. The repair system of claim 1, wherein the plurality of substantially identical gas turbine engine components includes at least 25 substantially identical turbine engine components.

5. The repair system of claim 4, wherein the plurality of substantially identical gas turbine engine component includes at least 200 substantially identical turbine engine components.

6. The repair system of claim 1, wherein the repair formula is a set of mathematical functions, each of which relates at least two parameters of the set of measured parameters for each gas turbine engine component.

7. The repair system of claim 1, wherein the suggested repair is a change in at least one of the measured parameters of the as-run gas turbine engine component.

8. The repair system of claim 7, wherein the suggested repair further includes at least one suggested process for achieving the change in the at least one of the measure parameters of the as-run gas turbine engine component.

9. The repair system of claim 7, wherein the at least one suggested process includes a blending operation.

10. The repair system of claim 1, wherein the repair module is configured to compare the outputs of the repair formula to a qualification and repair table and determine that the as-run gas turbine engine component deviates from a qualification parameter when at least one of the outputs fall outside of a set of ranges defined in the qualification and repair table.

11. The repair system of claim 10, wherein the suggested repair is a procedure that places the at least one of the outputs that falls outside of the set of ranges defined in the qualification and repair table within the set of ranges.

12. The repair system of claim 1, wherein the repair module is configured to provide the suggested repair to a maintenance system, thereby causing the maintenance system to affect the suggested repair.

13. The repair system of claim 1, wherein the at least one simulated engine model is a simulation of an actual engine in which the as-run gas turbine engine component is included.

14. A method for repairing a gas turbine engine component comprising:

training a repair formula via receiving a set of measured parameters for each gas turbine engine component in a set of as-run gas turbine engine components, wherein each as-run gas turbine engine component has the same general wear pattern and wherein the set of as-run gas turbine engine components are substantially identical, substantial being defined as within tolerances, the plurality of substantially identical gas turbine engine components includes components from a plurality of distinct engines, generating a variation model of the set of as-run gas turbine engine components, determining a simulated response of each of the as-run gas turbine engine components within a simulated engine model, and correlating variations in the set of measured parameters for each of the as-run gas turbine engine components in the set of as-run gas turbine engine components with a set of the predicted operations of each gas turbine engine component in the set of as-run gas turbine engine components, thereby generating a predictive model based on the variations, and said repair formula also being based upon component tolerances to which the components were compared as manufactured; and generating a suggested repair operation for a second gas turbine engine component for at least one engine by providing a set of measured parameters of the second gas turbine engine component to the repair formula, comparing a plurality of outputs from the repair formula to a qualification and repair table, and determining the suggested repair operation is unacceptable when at least one output in the plurality of outputs falls outside of a first set of ranges defined in the qualification and repair table, based at least in part on the plurality of component tolerances, wherein the plurality of outputs from the repair formula define a resultant component including at least one parameter outside of a component tolerance.

15. The method of claim 14, further comprising performing the suggested repair operation on the second gas turbine engine component and resulting in the resultant component still having at least one parameter outside of the component tolerances after the performance of the repair operation.

16. The method of claim 14, wherein the plurality of set of as-run gas turbine engine components includes at least 200 gas turbine engine components.

17. The method of claim 14, wherein each of the gas turbine engine components in the set of as-run gas turbine engine components is manufactured using a single manufacturing process.

18. The method of claim 17, wherein the second gas turbine engine component has the same general wear pattern as each as-run gas turbine engine component in the set of as-run gas turbine engine components.

19. The method of claim 14, wherein the repair formula includes a set of mathematical functions, each of which relates at least two parameters of the set of measured parameters for each gas turbine engine component.

20. The method of claim 14, wherein the suggested repair is a procedure that places the at least one of the outputs that falls outside of the set of ranges defined in the qualification and repair table within the set of ranges.

* * * * *